United States Patent [19]

Gabel et al.

[11] Patent Number: 4,518,853
[45] Date of Patent: May 21, 1985

[54] MAGNETIC STRIPE CHARACTER APPLYING MODULE

[75] Inventors: Edward R. Gabel, Minnetonka; Edward J. Puumala, Minneapolis; Rodney J. LeVasseur, Farmington, all of Minn.

[73] Assignee: Data Card Corporation, Minnetonka, Minn.

[21] Appl. No.: 493,771

[22] Filed: May 12, 1983

[51] Int. Cl.³ .............................................. G06K 7/08
[52] U.S. Cl. .................................. 235/449; 194/4 R; 235/438; 235/479; 235/480; 360/88
[58] Field of Search ............... 235/449, 475, 479, 480, 235/486, 493, 438; 360/2, 88; 194/4 R

[56] References Cited

U.S. PATENT DOCUMENTS 3,893,182 7/1975 Schmidt .......................... 235/475 X
4,185,730 1/1980 Roes et al. ....................... 235/449 X Primary Examiner—David L. Trafton
Attorney, Agent, or Firm—Kinney & Lange

[57] ABSTRACT

A module for applying a magnetic stripe character to a plastic card. A tiltable carriage moves the card along a transfer path past magnetic code applying apparatus when tilted in a first position. When the carriage is tilted into a second position, it returns along the transfer path to engage a further card while the first card is removed from the card transfer path by pinch rollers driven by a unidirectional clutch. Defective cards are removed from the card transfer path by a tiltable plate which opens a slot in the card transfer path to allow them to fall through the base plate.

15 Claims, 6 Drawing Figures

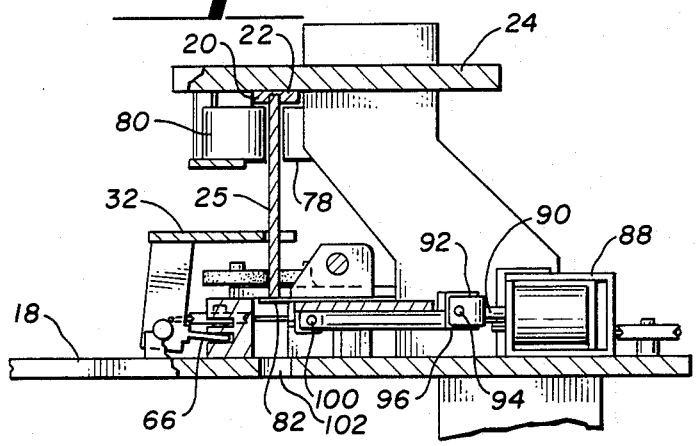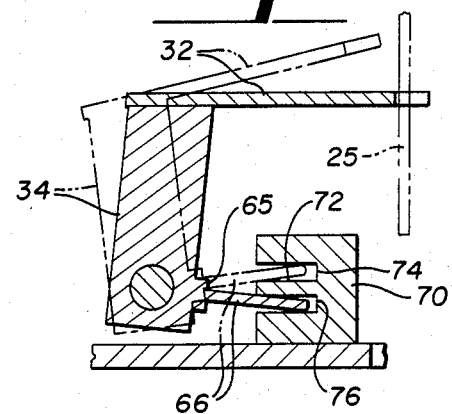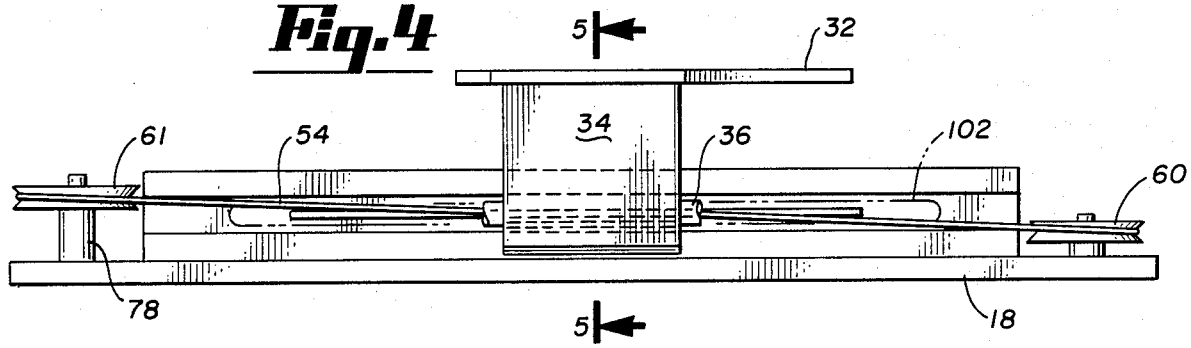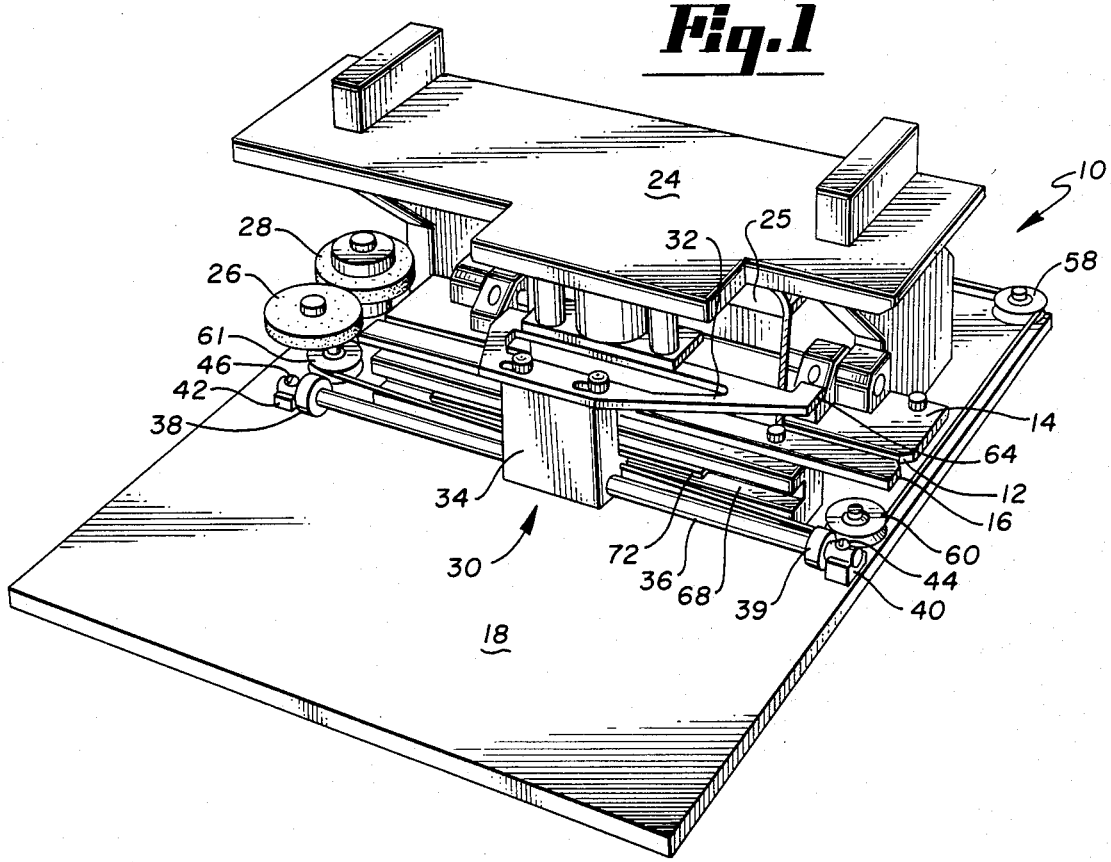

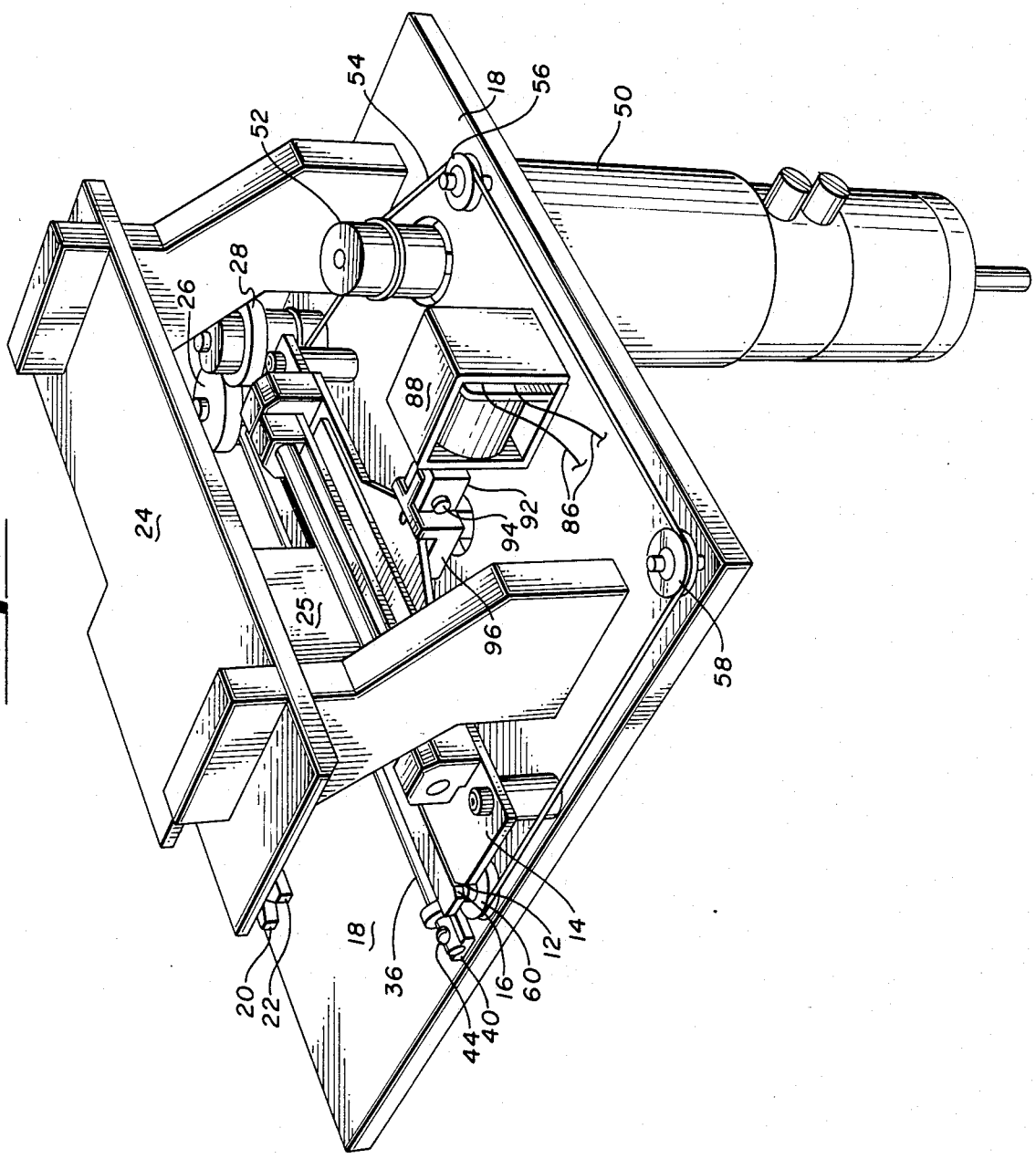

MAGNETIC STRIPE CHARACTER APPLYING MODULE

BACKGROUND OF THE INVENTION

Field of the Invention

This invention relates to card handling equipment and, more particularly, relates to a card transport mechanism for use in a magnetic stripe coding assembly for applying coded information to a magnetic coating on a plastic card.

In apparatus for manipulating a plastic card and applying coded information to the magnetic stripe on the card, it is necessary to have a simple and highly reliable apparatus for engaging the card, moving it past the magnetic code applying portions of the apparatus one or more times while the code is applied and then verified. It is also necessary to provide a relatively simple means for removing defective cards from the card transfer path so that time is not wasted in the machine by performing successive operations on cards known to be defective.

SUMMARY OF THE INVENTION

An object of the invention is to provide an arrangement for transporting plastic cards which operates in a simple and highly reliable manner to engage cards, move them past a work station one or more times and deliver good cards at the output end of the card transfer path, while rejecting defective cards from another portion of the card transfer path to a defective card hopper.

With this and other objects in view, an apparatus embodying the principles of the invention incorporates a frame having a card transfer path on it and carriage means mounted on the frame for moving the carriage along the transfer path. The carriage means includes card engaging means for engaging an edge of a card when the carriage means is placed in a first operating condition and for releasing the card when the carriage means is in a second operating condition. The transport means is movable along an axis parallel to the card transfer path for moving the card along the path when in the first operating condition and for moving independently of the card when in the second operating condition. The apparatus includes control means for switching the card engaging means between the first and second operating conditions at the ends of the card transfer path. The apparatus also includes drive means for moving the carriage means to transport a card from the input end of the card transfer path to the output end and for returning the carriage means to the input end of the card transfer path.

BRIEF DESCRIPTION OF THE DRAWINGS

FIG. 1 is a perspective view of the apparatus according to the invention.

FIG. 2 is a rear perspective view of the apparatus.

FIG. 3 is a partially cut-away side elevation view of the device viewed from the input end thereof.

FIG. 4 is an elevation view of the drive cable and its connections to the carriage means.

FIG. 5 is a sectional view of the structure in FIG. 4 taken along the lines 5—5 showing the carriage in the first operating condition engaging a card and showing, in phantom outline, the carriage means in the second condition wherein the carriage means is movable along the card transfer path independently of the card.

DETAILED DESCRIPTION OF THE PREFERRED EMBODIMENTS

Figure 6:
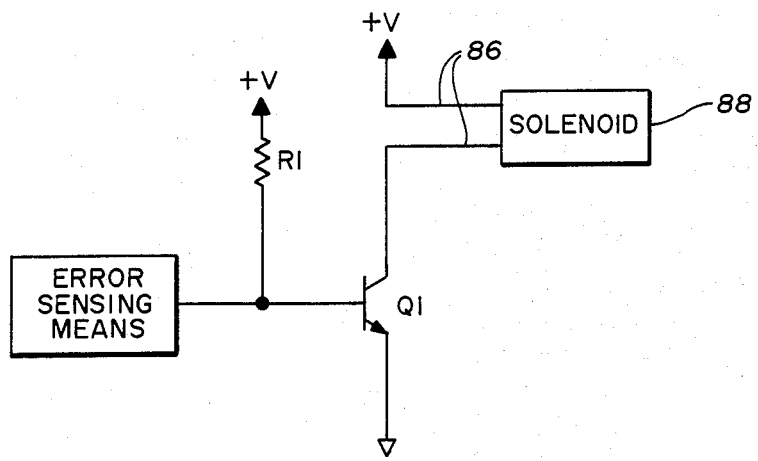
FIG. 6 is a simplified block diagram of the card reject circuitry.

In a machine for embossing and performing other operations on a document or card stock, such as plastic credit card blanks, a magnetic stripe character applying module 10 is shown in FIG. 1. A document, such as a card 25 or similar piece of sheet material, is delivered to the module 10 from the input or right side by magazine feed means which is not shown herein. The leading edge of the card is inserted in a guide slot 12 which appears between a plate 14 and a further guide bar 16. Both plate 14 and guide bar 16 are mounted on a main base plate 18. A further pair of guide rails 20 and 22 is shown in FIG. 3 mounted on a top plate 24. When card 25 is inserted in the lower slot 12 and in the upper slot between rails 20 and 22, it is supported in a position substantially vertical to base plate 18 as it is moved along a card transfer path from right to left in FIG. 1, across the width of the module 10 and into the nip of a pair of drive wheels 26 and 28 which engage the leading edge of card 25 as it reaches the end of the card transfer path defined by slot 12 and the slot between rails 20 and 22.

Movement of card 25 through module 10 is provided by a moving carriage 30 which cradles card 25 as it pushes it through the module. Carriage 30 includes an upper yoke 32 having at least one projecting finger for engaging the edges of a card. Yoke 32 is mounted on a slidable support block 34 which is mounted for slidable movement along a guide bar 36. Block 34 is constructed from nylon, Teflon or some similar material which can be readily slid along guide bar 36. Resilient end stops 38 and 39 cushion block 34 as it reaches the ends of its travel at either end of bar 36. Bar 36 is secured to plate 18, using blocks 40 and 42 which have semi-circular grooves in their top surfaces for receiving the bar 36. The bar is secured to blocks 40 and 42 by bolts 44 and 46.

Carriage 30 is driven back and forth along bar 36 by motor 50, as shown in FIG. 2. The shaft of motor 50 projects through plate 18 and has a drive hub 52 mounted on it. Drive hub 52 has a set of exterior threads on its outer surface. A drive cable 54 is wrapped several times around the threaded portion of hub 52 to assure a good frictional connection between drive hub 52 and cable 54. In the preferred embodiment of the invention, cable 54 is a conventional braided stainless steel dial cable which passes over idler wheels 56 and 58 at the rear of guide plate 18 and 60 and 61 at the front. Cable 54 is secured to a projecting block 65 which projects from the base of block 34 and faces toward the card transporting path.

Carriage 30 is operable in two positions. In the first position, block 34 is tilted toward the card transporting path to align upper yoke 32 so that its projecting fingers 64 are aligned with and projecting into the card transport path to engage and push cards along the path in either direction. In the other operating position of the carriage 30, the block 34 is tilted to a generally vertical position and the projecting fingers 64 of element 32 are not in contact with a card 25 in the card carriage path and do not project into the path. Block 34 is freely movable between the two operating positions at both ends of its travel. Projection 65 has a further projecting cam portion 66 which is freely movable in a slot 68 in block 70 which is a nylon or Teflon block mounted on base plate 18 adjacent the card transfer path.

At the ends of travel of the carriage 30, the groove 68 is large and permits the free movement of carriage 34 between its two operating positions as shown in FIGS. 3 and 5. In the central part of the card transfer path, the groove 68 has a tongue portion 72 which divides the groove into an upper and a lower slot 74 and 76, respectively. Slots 74 and 76 permit slidable movement of the projecting cam 66 therealong to support carriage 30 in either the first position engaging card 25 in the transfer path or in the second position where the card in the transfer path is not engaged. The carriage is placed in the first position to pass cards through the module and is placed in the second position to return to the input portion of the transfer path to engage a further card after a card has been coded. Because the carriage in the second position is returned along the transfer path to the input portion, it does not interfere with a card in the transfer path.

The switching of the carriage from the card engaging to the carriage return position is accomplished in a novel way without the use of electromechanical devices. As can be seen by examining FIG. 4, the idler wheel 60 is mounted closer to base plate 18 than idler wheel 61 which is mounted on a shaft separated from base plate 18 by a spacer 78. Thus, cable 54 at the left side of module 10 is spaced above the centerline of guide shaft 36 while, at the right side of module 10, it is spaced well below the centerline of shaft 36. Because cable 54 is secured to block 34 by connecting it to the projecting portion 64, a clockwise torque is applied to carriage 30 when it is at the right-hand side of module 10 and a counterclockwise torque is applied to it at the left-hand side. Because the tongue portion 72 only restrains movement between the first and second positions in the central portion of the card travel path, the carriage is rotated by the torque applied by cable 54 to the card engaging position at the right side of the module and the carriage return position at the left side of the module. Once the carriage is in the central portion of the card transfer path where cable 54 is generally at the same height as the centerline of the shaft 36 and no rotational torque is being applied, the carriage is stabilized in its proper operating position by slots 74 and 76. Thus, carriage 34 is moved between its two operating positions at the extreme ends of its travel in a positive acting and automatic manner without the use of solenoids or other electromechanical actuation devices.

As indicated previously in the preferred embodiment, module 10 may be used for applying magnetic characters to the magnetic strip portion on a plastic card. The characters may be applied by a magnetic head 78 which can be seen in FIG. 3. The other side of the card is supported and guided by an idler roller 80. As the card is transported along the transfer path by motor 50 and carriage 30, the magnetic characters are applied during the movement of the card from right to left, as viewed in FIG. 1. Carriage 30 is in the card engaging position. In order to verify that the card has been properly printed with the correct magnetic information, the motor 50 may be reversed in its direction of rotation to move carriage 34 back to the initial position as the card is passed through a second time and the information coded on the stripe is read.

As previously stated, in the embodiment shown, the card is thus passed along the transfer path two times. The first time it is moved past the recording head 78 and the magnetic characters are applied. Before it reaches the end of travel and carriage 30 switches into the disengaged carriage return mode, motor 50 is reversed in its direction of operation to return the carriage and card to the initial position. The motor is then reversed again and the carriage and card pass the record head area and the magnetic characters are read from the recording media on the card and their accuracy verified. Carriage 30 then moves to the full left extent of its motion and is switched into the card return position by the action of cable 54 and card 25 enters the nip of rollers 26 and 28. Roller 28 has a threaded hub thereon which includes a one-way clutch, causing drive force to be applied to roller 28 and idler roller 26 only when motor 50 is rotating in a direction to drive cards from right to left along the card transfer path as viewed in FIG. 1. Thus, when the leading edge of card 25 is inserted into the nip of rollers at the completion of a reading and verification operation, those rollers will transport the card out of module 10 to a further module for further operations, if necessary.

As card 25 is being moved out of module 10 by the operation of rollers 26 and 28 which are driven by cable 54, disengaged carriage 30 is being returned to its initial position to engage the next card which is inserted into slot 12 as carriage 30 returns to its starting position. When carriage 30 returns to its initial position, the torque from cable 54 moves into the card engaging mode and the next card is positioned for the writing operation.

In the event that the verification step of reading the magnetic strip after it is imprinted indicates that an error occurred, the module 10 has means for ejecting the card from the card transfer path. As can be seen in FIG. 3, the bottom edge of card 25 rests on support plate 82 as the card moves along the transfer path. In the event that a determination is made by the control or error sensing circuitry 83 that the magnetic stripe information on the card is incorrect, for example, an error signal is applied to solenoid windings 86 of solenoid 88 and the solenoid shaft 90 is retracted into the body of solenoid 88. As shown in FIG. 6, transistor $Q_1$ is driven by a voltage output of the control circuit 83 to apply current to solenoid 88. Solenoid shaft 90 is connected by means of a clevis 92 and a pin 94 to a bracket 96 which is pivotally connected to plate 82 by a pin 100. As shaft 90 is drawn into solenoid 88, bottom plate 82 is pivoted or swung downwardly to remove the support from the lower edge of card 25 and allow the card to drop out of the slot between rails 20 and 22 and fall through opening 102 in base plate 18 into a bin or other container for rejected cards. The reject arrangement provides a quick, simply operated means for removing a defective card from the card transfer path in a minimum time without interrupting the operation of other modules in a machine performing, for example, both embossing and magnetic stripe coding operations.

Although the present invention has been described with reference to preferred embodiments, workers skilled in the art will recognize that changes may be made in form and detail without departing from the spirit and scope of the invention as shown in the appended claims.

What is claimed is:

1. A card transport module for receiving cards inserted at an input end of a card transfer path and delivering cards at an output end of the transfer path comprising, in combination:

(a) a frame having a card transfer path thereupon;

(b) carriage means mounted on said frame for moving the card along said transfer path, said carriage means including card engaging means for engaging an edge of the card when in a first operating condition and for releasing the card when in a second operating condition, said transport means being movable along an axis parallel to the card transfer path for moving the card along the path when in the first operating condition and for moving independently of the card when in the second operating condition;

(c) control means for switching said card engaging means between said first and said second operating conditions at the ends of the card transfer path; and (d) drive means for moving said carriage means to transport a card from the input end of the card transfer path to the output end and for returning said carriage means to the input end of said card transfer path.

2. The invention of claim 1 wherein guide means are mounted on said frame for defining the card transfer path and said guide means comprise a first slotted guide member mounted on said frame and providing a slot for guiding the bottom edge of a card inserted therein and a second slotted guide member mounted above said frame and providing a slot for guiding the top edge of the card inserted therein.

3. The invention of claim 2 wherein said carriage means comprises:

a guide rail mounted on said frame parallel to said card transfer path; and slidable means mounted on said guide rail for movement therealong between said input means and said output means, said slidable means rotatably movable about the axis of said guide rail between a first operating condition wherein said card engaging means engages an edge of a card in the card transfer path and a second operating condition wherein the card engaging means is disengaged from said card.

4. The invention of claim 3 wherein the card engaging means comprises a card yoke having at least one finger portion projecting therefrom, said yoke constructed and arranged for inserting the finger portion thereof into the card transfer path when said carriage means is in said first operating condition and for retracting the finger portion from said card transfer path when said carriage means is in the second operating condition.

5. The invention of claim 3 wherein:

the carriage means also includes cam means projecting outwardly therefrom; and cam bar means are mounted parallel to the card transfer path, the cam bar means characterized by having a first guide slot therein constructed and arranged for receiving the cam means of said carriage means and positioning said carriage in the first condition and a second guide slot therein for receiving the cam means projecting from the carriage means and positioning said carriage in said second condition.

6. The invention of claim 5 wherein said control means comprises a driven flexible cable oriented parallel to said card transfer path and attached to said slidable means, the cable mounted at one height above the frame at the input end of the card transfer path and mounted at a second height above the frame at the output end of the card transfer path, said cable constructed and arranged for applying a rotational torque to said carriage means for inserting the cam means of said carriage means in the first guide slot at the input means end of the card transfer path and for moving the cam means of said carriage means to the second guide slot at the output end of the card transfer path.

7. The invention of claim 1 wherein card ejecting means are mounted on said frame for controllably removing selected cards from the card transfer path.

8. The invention of claim 7 wherein said card ejecting means comprises:

hinge plate means mounted beneath said guide means along said card transfer path;

error sensing means for comparing a selected parameter relating to the card to a standard and generating an error signal when the selected parameter deviates by a predetermined amount from a standard value; and control means operatively coupled to said error sensing means for moving said hinge plate means to an actuated condition thereby opening a channel beneath the card transfer path through which a card being moved by the transport means can be removed from the transport path between the input means and the output means.

9. The invention of claim 1 wherein the module also includes:

(e) magnetic stripe character applying means mounted adjacent the card transfer path for applying characters to the magnetic stripe portion of the cards as they are moved along the card transfer path between the input and output ends of the card transfer path while the card engaging means is in the first condition.

10. The invention of claim 9 wherein said control means includes means for switching said card engaging means from the first to the second operating condition after the characters are applied to the magnetic stripe and when the card has reached the output end of the module, thereby releasing the card from said carriage means prior to moving said carriage means to the input end of the transfer path to receive another card.

11. The invention of claim 9 wherein the module also includes:

(f) at least one pair of pinch roller means positioned adjacent the card transfer path for engaging the leading edge of a card after application of characters to the magnetic stripe portion thereof and for ejecting the card therefrom as said control means switches the card engaging means between the first and second operating conditions and as said drive means returns said transport means to the input end of the card transfer path for receiving a further card inserted therein.

12. The invention of claim 11 wherein said pinch roller means are driven by said drive means by means of a one-way clutch which actuates said pinch rollers for driving cards from the card transfer path only when transport means is being driven from the output end to the input end of the card transfer path.

13. The invention of claim 9 wherein said module also includes means for verifying the correct application of characters to the magnetic stripe portion of the card as the card is moved along the card transfer path and also includes:

(g) reject means positioned along the card transfer path, said reject means constructed and arranged for removing certain cards from the card transfer path.

14. The invention of claim 13 wherein said reject means comprises a pivotally mounted plate portion which, in the normal position, serves as a part of the card transfer path and, in a reject position, is pivoted to an opened position to allow a rejected card to fall through said frame to be removed from the card transfer path.

15. The invention of claim 1 including guide means mounted on said frame and comprising at least one pair of rails mounted on said frame for defining a card transfer path;

said carriage means includes a slidable means mounted on a rod aligned parallel to the card transfer path and a pair of card engaging fingers projecting outwardly from said slide to engage the leading and trailing edges of a card positioned in the card transfer path, said transport means being constructed and arranged for movement around the axis of said rod means between said first and said second operating conditions, said slidable means including a projecting link and wherein said drive means comprises a motor driven cable, a portion of which is oriented adjacent the card transfer path, said drive means being constructed and arranged with one end of said cable at a relatively lower elevation above the frame than the other end, said drive means connected to said projecting link means for driving said transport means and for tilting said carriage means thereby switching said carriage means between said first and said second operating conditions at opposite ends of the card transfer path.

* * * * *